(12) United States Patent
Drapeau et al.

(10) Patent No.: US 12,205,119 B2
(45) Date of Patent: Jan. 21, 2025

(54) SYSTEMS AND METHODS FOR PRIVACY PRESERVING FRAUD DETECTION DURING ELECTRONIC TRANSACTIONS

(71) Applicant: Stripe, Inc., San Francisco, CA (US)

(72) Inventors: Ryan Drapeau, Seattle, WA (US); Feiyi Ouyang, Seattle, WA (US); Mathieu Hofman, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 791 days.

(21) Appl. No.: 17/383,107

(22) Filed: Jul. 22, 2021

(65) Prior Publication Data

US 2023/0026121 A1 Jan. 26, 2023

(51) Int. Cl.
| | |
|---|---|
| G06Q 20/40 | (2012.01) |
| G06F 16/955 | (2019.01) |
| G06N 20/00 | (2019.01) |
| G06Q 20/38 | (2012.01) |

(52) U.S. Cl.
CPC ..... *G06Q 20/4016* (2013.01); *G06F 16/9566* (2019.01); *G06N 20/00* (2019.01); *G06Q 20/3827* (2013.01); *G06Q 2220/00* (2013.01)

(58) Field of Classification Search
CPC .............. G06Q 20/00–425; G06N 20/00–20
See application file for complete search history.

(56) References Cited

U.S. PATENT DOCUMENTS

| | | | |
|---|---|---|---|
| 7,769,820 B1* | 8/2010 | Spies | H04L 63/08 |
| | | | 709/219 |
| 2009/0287706 A1 | 11/2009 | Bourges-Waldegg et al. | |
| 2014/0052518 A1 | 2/2014 | Humphries, IV et al. | |
| 2015/0295938 A1 | 10/2015 | Guo et al. | |
| 2018/0024943 A1 | 1/2018 | Xu et al. | |
| 2020/0327548 A1 | 10/2020 | Hartard | |
| 2021/0042442 A1* | 2/2021 | Al-Kabra | H04L 67/10 |

OTHER PUBLICATIONS

International Search Report and Written Opinion on the Patentability of Application No. PCT/US2022/037965 Mailed Nov. 4, 2022, 7 pages.

* cited by examiner

*Primary Examiner* — Mohammad A. Nilforoush
(74) *Attorney, Agent, or Firm* — Foley & Lardner LLP

(57) ABSTRACT

A method and apparatus for performing privacy preserving fraud detection in network based transactions are described. The method may include receiving a fraud detection message during a transaction between a user system and a merchant system, the message having a set of cryptographically transformed universal resource locator (URL) components generated from a URL of a web page of the merchant system on which the transaction is to occur. The method may also include generating one or more secure and anonymous fraud detection features, each fraud detection feature comprising a select subset of the cryptographically transformed URL components. The method may also include performing fraud detection for the web page using the one or more secure and anonymous fraud detection features to determine a likelihood that fraud is occurring in the transaction.

22 Claims, 6 Drawing Sheets where $h_i = F(\text{parsed URL component}_i)$ where $h_i = F(\text{parsed URL component}_i)$, and
$T(h_j)$ = Truncation of $h_j$ to a fixed number of characters < an original number of characters.

SYSTEMS AND METHODS FOR PRIVACY PRESERVING FRAUD DETECTION DURING ELECTRONIC TRANSACTIONS

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the merchant transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

To prevent fraudulent transactions, the commerce system may perform fraud detection for transactions. Such fraud detection can include attempting to determine, based on parameters associated with a transaction, whether there is a likelihood that the transaction is fraudulent. Such parameters used for fraud detection can include payment parameters, parameters associated with an interface in which the transaction is occurring, a web page address (e.g., a universal resource locator (URL)) associated with a web page from which a transaction is occurring, as well as other parameters. When using web page addresses to detect fraudulent activities during remote and electronic transactions, for example, whether one or more of a web page address, path of an address, query from an address, etc. is associated with one or more past fraudulent transactions may be indicative of transaction fraud. That is, the fraud detection seeks to determine when one or more factors associated with the web page address for the web page on which a transaction is occurring are indicative of fraud.

However, such techniques include the transfer of a web page address, storage of an address, and processing of the web page address for fraud detection. Furthermore, the transaction information will usually include various identifiers, such as merchant identifiers associated with a merchant for whom the transaction is being performed, user identifiers (e.g., name, address, phone number, card data, etc.) used in completing a transaction, as well as other identifiers. This leads to a problem associated with protecting the privacy of the user's browsing activity taking part in the transaction. That is, the identifiers when paired with the web page address information used for fraud detection may enable the tracking of user browsing activity across web pages and/or different web sites of different merchants. Thus, a user's actual privacy during online transactions falls short of their expectations of privacy.

Therefore, a technical approach to detecting fraud originating from specific web addresses during online and remote transactions, while preserving the privacy of a user's browsing activity, which is also secure, is efficient in terms of network communication, and reveals fraudulent activity, is needed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
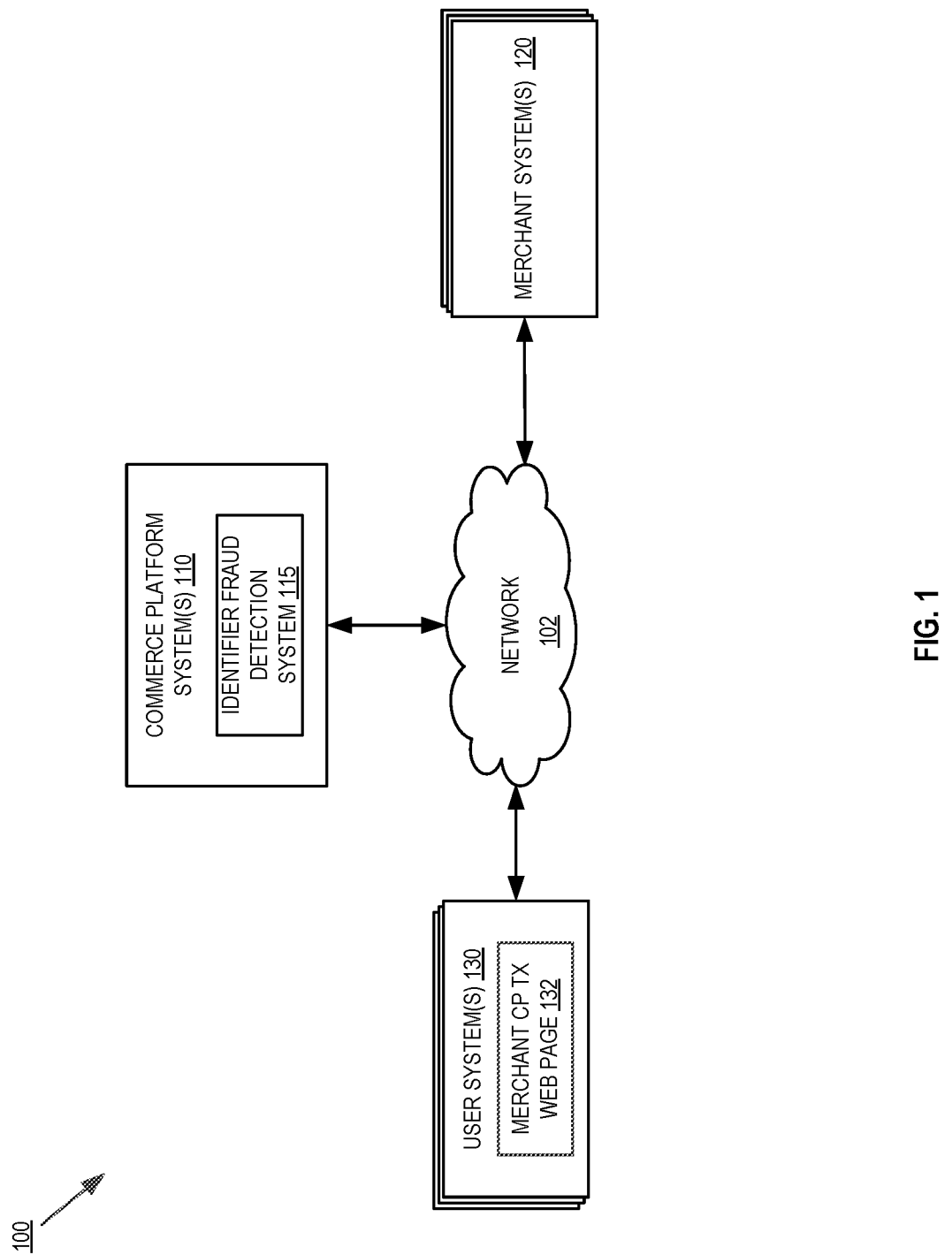
FIG. 1 is a block diagram of an exemplary system architecture for privacy centric fraud detection in network based transactions.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "parsing", "generating", "performing", "returning", "detecting", "determining", "compressing", "constructing", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for privacy centric fraud detection in network based transactions. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during electronic transactions conducted over a network based on web page addresses of one or more web pages on which a transaction is occurring, while preserving the privacy of a user, may use and/or extend the techniques discussed herein. However, to avoid obscuring the embodiments discussed herein, fraud detection during network based transactions by a commerce platforms system is discussed to illustrate and describe the embodiments of the present invention, and is not intended to limit the application of the techniques described herein from applicability to other systems in which fraud detection could be used.

The commerce platform system(s) 110, merchant system(s) 120, and user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and user system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or merchant user system(s) 130. For example, commerce platform system(s) 110 may manage merchant accounts held at the commerce platform, run financial transactions initiated at user system(s) 130 performed on behalf of a merchant system 120, clear transactions, performing payouts to merchant and/or merchant agents, manage merchant and/or agent accounts held at the commerce platform system(s) 110, as well as other services typically associated with commerce platforms systems such as, for example, STRIPE™.

In one embodiment, merchant system 120 provides a web page encoded with merchant commerce platform transaction interface (merchant CP TX web page 132). The merchant CP TX web page 132, in embodiments, is a web page based application by which merchant system 120 offers goods or services to a user of user system 130. However, other types of merchant applications (e.g. mobile apps, standalone applications, etc.) that utilize web pages during transactions may also be integrated with the services of the commerce platform, including the use of cryptographically transformed web page based identifiers used for fraud detection, as discussed herein. For example, the merchant CP TX web page 132 may provide a sequence of web pages including listings of products, services, pricing, product searches, product configurations, etc. that a user of user system 130 may browse and use to configure a purchase. In embodiments, the merchant CP TX web page 132 is integrated with one or more commerce platform system 110 components, such as functions, application programming interface(s) (API(s)), software development kit(s) (SDK(s)), etc. developed and distributed by the commerce platform system 110, which enable the commerce platform system 110 to perform aspects of the transaction directly between the user system 130 and the commerce platform system 110. For example, commerce platform system code, SDK(s), and/or API(s) integrated into the merchant CP TX web page 132 enable commerce platform systems 110 to handle the collection of purchase card information, collection of user information, configure purchase options, configure product options, etc. from a user of user system 130 in order to process a merchant-user transaction. Through the deployment of the commerce platform functionality (e.g., code, API(s), SDK(s), etc.), commerce platform system 110 not only handles financial aspects of the user-merchant transaction, but further insulates the exposure of the user's financial information to the merchant's application and/or merchant system. Approaches of integrating commerce platform code, API(s), SDK(s), etc. into a merchant web based application, mobile app, or other application using web pages for processing transactions, are described in U.S. Pat. No. 9,940,653, titled "SYSTEMS AND METHODS FOR A COMMERCE PLATFORM COORDINATING TRANSACTIONS WITHIN THIRD PARTY APPLICATIONS", issued on Apr. 10, 2018, as well as in U.S. Pat. No. 9,830,596, entitled "METHOD FOR CONDUCTING A TRANSACTION BETWEEN A MERCHANT SITE AND A CUSTOMER'S ELECTRONIC DEVICE WITHOUT EXPOSING PAYMENT INFORMATION TO A SERVER-SIDE APPLICATION OF THE MERCHANT SITE", and issued on Nov. 28, 2017, which are incorporated by reference herein in its entirety.

To prevent fraudulent transactions, in embodiments, commerce platform system(s) 110 utilizes identifier fraud detection system 115. As will be discussed in greater detail below, the identifier fraud detection system 115 performs fraud detection to identify fraudulent activity based, at least in part, on web page information. However, the approaches discussed herein are privacy preserving in that the web page information used by identifier fraud detection system 115 includes cryptographically transformed identifiers that obfuscate and anonymize the web page address and address components from which the identifiers were generated. Furthermore, the cryptographically transformed identifiers, when used as discussed in greater detail below, enable commerce platforms system(s) 110 to perform fraud detection without a loss of fraud detection ability, while at the same time ensuring user privacy. Thus, a technical approach to fraud detection without a loss of fraud detection ability, while preserving user privacy, is achieved.

In embodiments, commerce platform system(s) 110 utilize identifier fraud detection system 115 to perform fraud detection during transactions. As discussed in greater detail in FIG. 2, identifier fraud detection system 115 employs one or more machine learning techniques to detect fraud during transactions. In embodiments, the machine learning techniques employ one or more models trained using previously detected fraud with one or more pieces of transaction data, such as web page addresses and/or components of web page addresses. That is, for example, URL https://www.badmerchant.com/checkout may be associated with a number of previously reported and/or detected fraudulent transactions, URL https://www.goodmerchnat.com/checkout may be associated with another number of previously reported and/or detected fraudulent transactions, and so on. Thus, the machine learning models employed by identifier fraud detection system 115 are trained to detect fraud using the number of detected fraudulent instances that are associated with a web page address and/or subsets of web page address components. Then, each component or set of components becomes a key, from which a value of the number of fraud instances can be determined, and used for training the machine learning model to determine a likelihood of fraud given various key and value pairs in a transaction. Then, during deployment, the keys may also be used to look up associated values as input to the trained machine learning models for determining a likelihood of fraud during a transaction. It should further be noted that in embodiments, the machine learning model may employ other key-value pairs for training and deploying fraud detection models, such as merchant key(s), user key(s), transaction parameter key(s), and other key(s) with corresponding associated values, for creating a holistic picture of the factors used for predicting fraud. However, to avoid obscuring the techniques discussed herein, the focus of the embodiments described herein will be on keys and values generated from web page addresses, and detecting fraud based on such data derived from web page addresses.

Figure 6A:
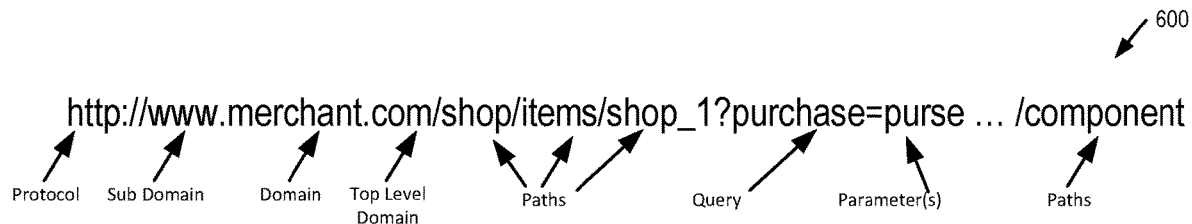
FIG. 6A illustrates an embodiment of an example universal resource locator.

In embodiments, the keys used in training the machine learning models and subsequent use of the machine learning models are privacy preserving keys, each associated with their respective fraud count values. More specifically, in embodiments, each component of a web page is cryptographically transformed into a unique and non-reversible identifier. For example, FIG. 6A illustrates an example web page address 600, such as an address associated with a merchant CP TX web page. The components can include a protocol component, a sub domain component, a domain component, a top level domain component, one or more path components, query component, query parameter component(s), as well as other component types, combination of components, etc.

In embodiments, each of these components is cryptographically transformed, for example using a hashing process such as Message Digest 5 (MD5), Secure Hashing Algorithm 256 (SHA256), or other hashing techniques. Once transformed, the meaning within the context of the web page address from which the component originates is irreversibly obfuscated. Then, the cryptographically transformed value may be used as the key, with which fraud detection values are associated, for training and deploying the fraud detection models discussed herein. By using the cryptographically transformed value, the actual web page address information may not be determined by the commerce platform system 110 or nefarious actors (not shown), thereby preserving a user's privacy with respect to their browsing activity. Furthermore, since the machine learning models are trained to detect fraud based on values (e.g., number of instance of detected fraud) associated with keys (e.g., cryptographically transformed web page component), there is no loss of the ability to detect fraud, even while preserving user privacy.

A naive approach to keys used for training and using a fraud detection model would be to associate a full web page address with an associated fraud count. For example, the URL 600 in FIG. 6A could be associated with a fraud count, and a key (e.g., $F_{hash}$(URL 600)= a%jk1037u4kdfuo%*kdfouerjdou190834570kldf07) associated with that count. However, a slightly different URL from the same merchant, shop, items, etc. than that illustrated in FIG. 6A, such as one with a different query parameter (e.g., "?purchase=wallet"), would result in a different key value. This, however, is not ideal in that it prevents MLM training and deployment of fraud detection count values, such as fraud detected across all merchant transactions (e.g., fraud counts for "www.merchant.com"), all transactions occurring on a subset of an address (e.g., fraud counts for "merchant.com/shop", "merchant.com/shop/items", etc.), as well as other potentially relevant fraud detection features.

Figure 6B:
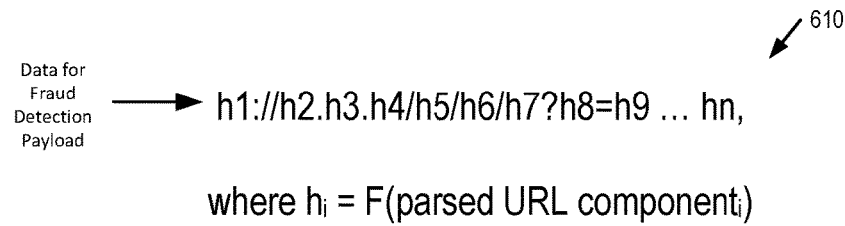
FIGS. 6B and 6C illustrate embodiments of cryptographically transformed identifiers generated from the universal resource locator of FIG. 6A.

In embodiments, the machine learning model(s) employed by identifier fraud detection system 115 therefore utilize the cryptographic transformation of each web page component with a web page address. For example, FIG. 6B illustrates the URL 600 transformed on a web address component basis into transformed URL 610. More specifically, each $component_i$ within URL 600 is cryptographically transformed so that each component and/or subsets of components can be associated with fraud counts when training a machine learning model and when subsequently using the trained model. Furthermore, in embodiments, the transformed URL 610 preserves the structure of the original URL, so that subsets of transformed components may be used as composite features, for example, to capture additional relevant fraud detection counts (e.g. across all merchant transactions, occurring within a specific path, occurring for specific searches, etc.). Furthermore, preserving the structure of the URL further enables the ability to associate identifiers with their purpose within a web page address (e.g., top level domain, domain, query, parameters, paths, etc.).

Then, after training, the machine learning model employed by identifier fraud detection system 115 may be used to predict the likelihood of fraud within a current transaction, based at least in part, on a cryptographically transformed web page address for the web page on which the transaction is occurring. For example, a new transaction may originate from the web page address "https://www.merchant.com/checkout/shop_2". Although this particular URL may not have been previously seen, some components parts and subsets of component may have fraud detection values associated with their respective keys, enabling identifier fraud detection system 115 to perform fraud detection during the transaction.

In embodiments, merchant CP TX web page 132 generates a fraud detection payload based, at least in part, on a web page address of the merchant CP TX web page 132. In embodiments, commerce platform components of the merchant CP TX web page 132 parse the URL of the merchant CP TX web page 132 by detecting special characters within the web page address (e.g., ".", "/", "//", "?") that delineate the different components of the web page address. For example, URL 600 would be parsed into "http", "www", "merchant", "com", "shop", and so on. Then, commerce platform components of the merchant CP TX web page 132 would individually cryptographically transform each of the web page address components. Furthermore, the components could further be reassembled into the format of an URL using the transformed components and the special characters. That is, URL 600 could be transformed into transformed URL 610, where each $component_i$ in the original URL 600 is replaced with $hash_i=f(component_i)$. Then, each hashed component is used to generate a fraud detection payload. In one embodiment, the payload includes a reassembled but transformed URL 610, such as $h_1://h_2.h_3.h_4/h_5/h_6/h_7?h_8=h_9 \ldots h_n$, as illustrated in FIG. 6B. The transformed URL 610 may then be inserted into a fraud detection communication payload and transmitted, via network 102, to the identifier fraud detection system 115 of commerce platform system(s) 110.

Figure 6C:
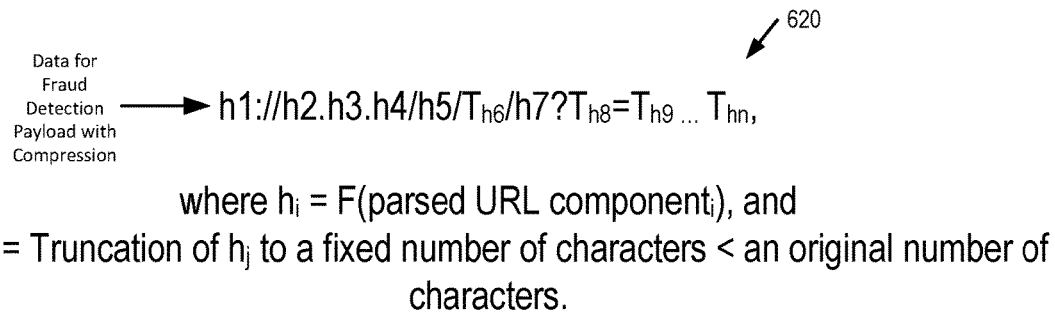

Each hashed component may have a size of 64 bytes, for example when SHA256 is used as the hashing function. Because web page addresses may be very complex with several to hundreds of address components, it is not infeasible for a transformed URL to reach a size of several megabytes or larger. This problem is exacerbated when several page loads would result in several fraud detection communications. That is, if each page load caused a fraud transaction communication of several megabytes, the communication exchange, and thus the user's transaction experience, would be unacceptably slow. Thus, to preserve network bandwidth and ensure transaction efficiency, in embodiments, the commerce platform components of merchant CP TX web page 132 compress the transformed URL 610 into a compressed transformed URL 620, as illustrated in FIG. 6C. In embodiments, each hashed component in a selected subset of the hashed components (e.g., $h_j, h_k, \ldots h_m$, a subset of $h_1 \ldots h_n$) may be truncated to, for example, the first 6, 8, 12, etc. characters of their respective hash values. Then, a combination of hashed web address components and truncated hashed components could be used to generate compressed transformed URL 620. Furthermore, in this embodiment, such truncated hashed features would also serve as keys with associated fraud detection values, for training and using a fraud detection machine learning model, as discussed herein. Additionally, each truncated value, although less than 64 bytes, would likely provide a good measure of collision avoidance with other truncated hash values.

In embodiments, a threshold number of components is used to determining when to perform compression on a transformed URL. For example, when a number of components exceeds a threshold, such as the number of web page address components exceeds a threshold of 10, 20, 30, 40, etc. components, then compression is employed by merchant CP TX web page 132. Further, when compression is determined to be employed, selection criteria that prioritizes the most informationally rich portions of the web page address may be employed to determine the subset of hashed components which are to be compressed (i.e., truncated). For example, authority parts of a web page address are maintained and not to be included as the selected subset of compressed components, components occurring earlier in a web address are maintained while component parts later in the web address are compressed and/or combined (e.g., (a) no more than the first 30 paths hashed in full, with all remaining paths combined and a single hash generated; (b) keep first 10 path and query component hashes in full, and store truncated values for remaining path and query components; and so on). Thus, the portions of the web page address likely to provide the most information for fraud detection are maintained with full hash values, while portions potentially having less informational value are more likely to be truncated. Other selection criteria may be used for compression of the transformed ULR consistent with the discussion herein.

In embodiments, identifier fraud detection system 115 receives a fraud detection communication from merchant CP TX web page 132 including the payload with the transformed, and optionally compressed, URL. Identifier fraud detection system 115 parses the transformed, and optionally compressed, URL from the payload of the fraud detection message to obtain extract the individual web page components, which serve as keys or sets of keys associated with one or more fraud detection features. That is, keys or sets of keys may be associated with different fraud detection features, such as keys indicative of a sub domain, domain, and top-level domain, 10 keys indicative of the first ten individual elements of a web page address (e.g. each individual component of URL 600), the combined 10 keys indicative of a web page address with the 10 components (e.g., the entirety of URL 600). These keys or sets of keys are used to obtain fraud detection values (e.g., counts of previously detected fraud associated with the keys or sets of keys), which are analyzed by a machine learning model to predict a likelihood of fraud with respect to a current transaction.

When fraud is likely within a transaction, based on identifier fraud detection system's 115 analysis of the keys and values using a trained machine learning model, identifier fraud detection system 115 takes one or more corrective actions, such as declining the transaction, notifying a merchant system 120 associated with the merchant CP TX web page 132 on which fraud was detected, adding the fraud detection and keys-values to training data for retraining the machine learning model(s) of identifier fraud detection system 115. However, when no fraud is detected, the transaction may proceed without delay.

Thus, identifier fraud detection system 115 and the commerce platform components (e.g., API(s), SDK(s), functions distributed by the commerce platform system 110) integrated into the merchant CP TX web page 132 enable robust fraud detection that is capable of using a large number of web page address features to detect fraud during transactions. Furthermore, the web page address features are cryptographically transformed so that commerce platform system(s) 110 are not aware of specific web addresses upon which fraud detection is being performed, thereby preserving user privacy and ensuring data security of the user's browsing activity (even if intercepted by a nefarious actor). Additionally, based on web page address complexity, compression may be employed to reduce message size and bandwidth consumption, while still enabling robust fraud detection.

Figure 2:
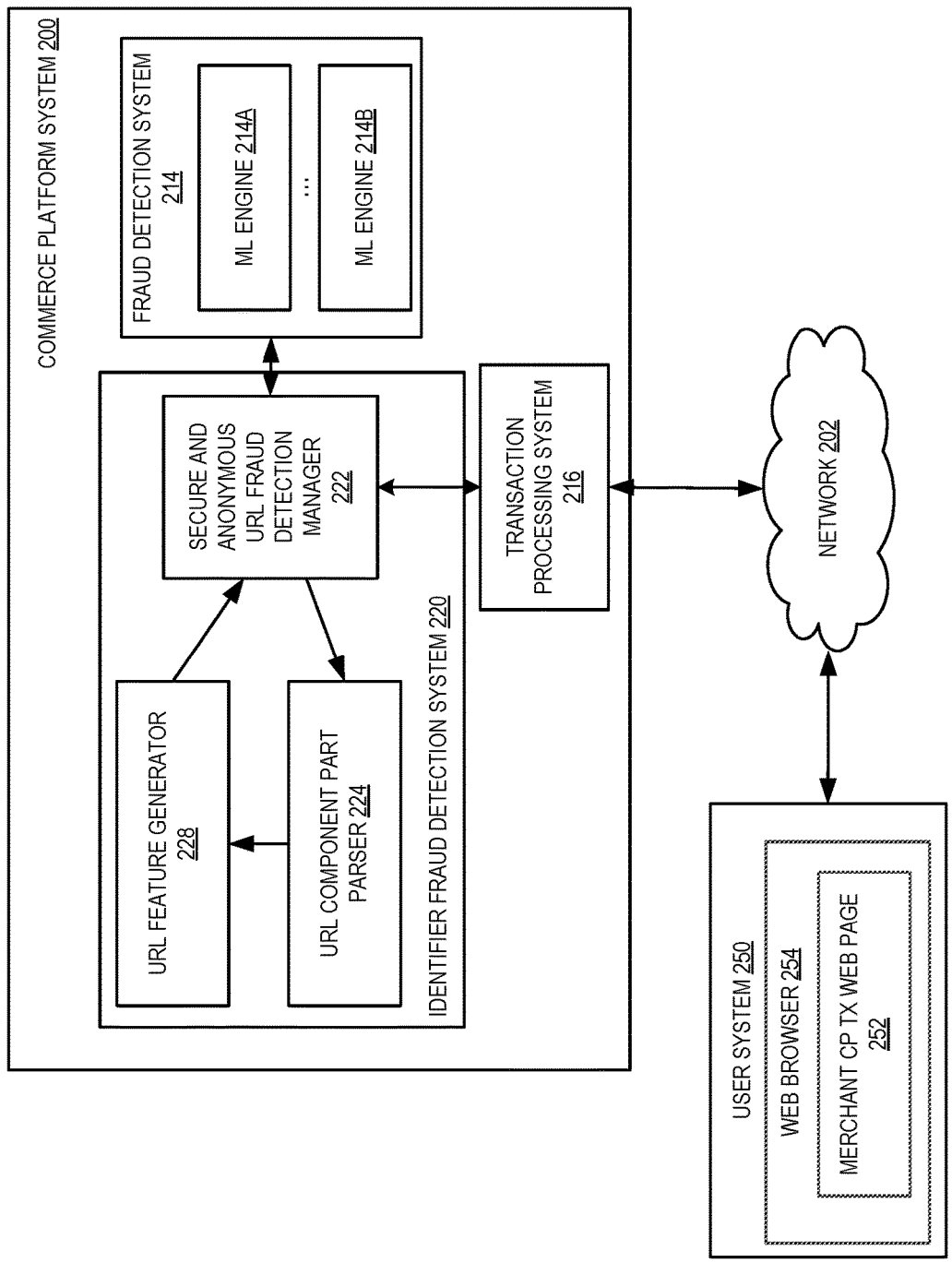
FIG. 2 is a block diagram of one embodiment of a commerce platform system using cryptographically transformed identifiers for privacy preserving fraud detection in network based transactions.

FIG. 2 is a block diagram of one embodiment of a commerce platform system 200 using cryptographically transformed identifiers for privacy preserving fraud detection in network based transactions. Commerce platform system 200 provides additional details for the commerce platform system(s) 110 discussed above in FIG. 1.

In one embodiment, commerce platform 200 includes an identifier fraud detection system 220, a fraud detection system 214, and a transaction processing system 216. As discussed herein, the identifier fraud detection system 220 may employ a secure and anonymous URL fraud detection manager 222, a URL component part parser 224, and a URL feature generator 228. In some embodiments, the secure identifier manager 222 may also interact with fraud detection system 214 to perform one or more types of machine learning model analysis, provide training data, as well as to perform other interactions.

In one embodiments, user system 250 includes a web browser 254 for rendering merchant CP TX web page 252. As discussed herein, the merchant CP TX web page 252 is a merchant web page based application that a user of user system 250 uses to perform a transaction with a merchant (not shown). Furthermore, merchant CP TX web page 252 is integrated with one or more commerce platform system components, such as functions, API(s), SDK(s), etc., enabling merchant CP TX web page 252 to communicate fraud detection messages to transaction processing system 215 during a transaction.

In embodiments, the one or more commerce platform system components of merchant CP TX web page 252 are responsible for generating a fraud detection communication including a transformed, and optionally compressed, URL for a fraud detection payload. More specifically, for each page load of merchant CP TX web page 252, the one or more commerce platform system components of merchant CP TX web page 252 parse the web page address to locate special characters within the web page address, and extract the web page address components delineated by those special characters. For example, URL 600 of FIG. 6A would be parsed to extract data, such as "www", "merchant", "com", "shop", etc. Each of these components is then cryptographically transformed using, for example, a one-way hash function, such as SHA256, MD5, or other cryptographically secure data transformation technique.

In embodiments, one or more commerce platform system components of merchant CP TX web page 252 further determine a number of such extracted and hashed components to determine if optional compression is to be employed. As discussed above, selection criteria for a subset of components to compress includes determining whether a threshold number of hash components has been exceeded within a web page address, and if so, selecting a specific subset to maintain as full hashes (e.g. keeping full hashes of a first n number of components, keeping full hashes of a first k paths and query strings, etc.), and compressing the remaining components (e.g., truncating components n+1 to a maximum number of components, truncating paths and queries k+1 to a maximum number of components, combining any remaining components that would exceed the maximum into a single string and hashing that string as its own component, etc.).

After the transforming of web page components, with optional compression, the one or more commerce platform system components of merchant CP TX web page 252 assemble a fraud detection payload within a fraud detection message. In embodiments, the fraud detection payload includes a reassembled URL with the transformed (and optionally compressed) components, such as that illustrated in FIG. 6B or 6C. The merchant CP TX web page 252 transmits the fraud detection communication to the transaction processing system 216. It should be noted that a fraud detection communication is generated and transmitted for each page load during a transaction to mitigate fraud at each stage of a transaction and the web page associated with the processing of that stage of the transaction.

The merchant CP TX web page 252 then transmits the fraud communication message, with the transformed (and optionally compressed) URL, to the transaction processing system 216 of commerce platform system 200.

In embodiments, transaction processing system 216 is responsible for interfacing with merchant commerce platform transaction web page (merchant CP TX web page 252) during a user-merchant system transaction. For examples, commerce platform system API(s) integrated within web page 252 generate API based message calls (e.g., get, post, etc.) to API endpoints of the commerce platform system 200 (e.g., transaction processing system 216 executing one or more API endpoints), the API message calls received and interpreted by transaction processing system 216. Such API based messaging can include communicating the fraud detection message to an endpoint of transaction processing system 216 responsible for such fraud detection messaging.

Furthermore, transaction information, such as card data, user data, purchase configurations, etc. are received by transaction processing system 216, in encrypted form. Transaction processing system 216 will process the transaction parameters to complete the transaction based on results of the identifier fraud detection system(S) 220 analysis, as well as results of the fraud detection system's 214 analysis.

In embodiments, for a received fraud detection message, transaction processing system 216 forwards the message to secure and anonymous URL fraud detection manager 222. Manager 222 is responsible for detecting a transformed (and optionally compressed) URL within a payload of the received fraud detection message. When the payload includes a transformed (and optionally compressed) URL, the payload is forwarded to the URL component part parser 224.

URL component part parser 224 is responsible for parsing hashed component parts from a reassembled URL. URL component part parser 224 operates similarly to that discussed above by identifying special characters within the transformed (and optionally compressed) URL, which delineate each hashed web page address component. That is, the parsing and extraction of hash values indicates whether a hash value is associated with a protocol component, a top-level domain, a domain, a path, a query, a query parameter, etc. of an original web page address, based on the structure of a URL in the fraud detection payload. Then, the parsing results, and data indicative of hash components' purposes within a web page address, are provided to URL feature generator 228.

URL feature generator 228 is responsible for generating one or more features for performing machine learning based fraud detection. Such features include the selection of specific hash values and/or sets of hash values indicative of various levels of detail of a web page address. That is, a feature may include differentiation between top level domains, another feature may combine the hashes of the sub domain, domain, and top level domain for aggregating fraud across all merchant transactions, and any other set of web page address features and/or combinations.

The feature set is then provided to manager 222 for forwarding to fraud detection system 214 for performing fraud detection using the set of one or more features.

In embodiments, fraud detection system 214 applies one or more machine learning engines 214A through 214B to perform fraud detection prior to approving a transaction. In embodiments, fraud detection system 214 includes one or more machine learning analysis engines, such as ML engines 214A and 214B, utilized in determining whether a current or future transaction is fraudulent. When a likely fraudulent transaction is detected, based on a set of features, the transaction may be cancelled to prevent loss due to the transaction. In certain aspects, the ML engine(s) 214A and 214B implement at least one machine learning model selected from the following non-limiting examples: Random Forest, Classification and Regression Tree, boosted tree, neural network, support vector machine, general chi-squared automatic interaction detector model, interactive tree, multi-adaptive regression spline, and naïve Bayes classifier. In one embodiment, the models of ML engines 214A and 214B are an XGBoost tree-based model and a deep neural network model, however, other models or combination of models may be used. In the embodiments, the ML engines 214A and 214B can be used to determine, for a given transaction and features determined for an URL, the likelihood that the transaction is fraudulent based at least in part on a prediction of the probability or likelihood of the feature set associated with the URL indicating fraudulent activity. This likelihood can be mapped to a standard scale (e.g., between 0.0 and 1.0), or other value, from which a determination of likelihood of fraud may be predicted.

To determine the probability or likelihood that a transaction is fraudulent, the ML engines 214A and 214B may create or utilize one or more models. In an embodiment, models can be constructed, trained, and refined to use values corresponding to feature sets extracted from web page address, such as counts associated with web page address features (e.g., total number of transactions, number of declines, number of chargebacks, number of reversals, etc.). Furthermore, user based factors associated with card data, such as expected transaction amount, expected IP address, expected contact information, etc. may also be used by ML engine(s) 214A through 214B.

In embodiments, the models used by ML engine(s) 214A and 214B can at least partially be created offline using transaction and URL based features and transaction records associated with prior fraud detection (e.g., to generate counts associated with declines, reported fraud, chargebacks, etc.). In embodiments, ML engine(s) 214A and 214B can be trained using training data based on various user, URL, and/or transaction based features, and may further be refined over time based future transactions for which no fraud was detected and no fraud existed, no fraud was detected but fraud did exist, fraud was detected and no fraud existed, fraud was detected and fraud did exist. In embodiments, such training data may be gathered from a transaction data store (not shown).

In embodiments, one or more ML training techniques appropriate for a given model may be executed by ML engine(s) 214A and 214B periodically as new/additional training data becomes available, as well as in real-time using, for example, session data and transaction data as transactions occur. The specific models used for a predicting the likelihood of fraud may vary based on factors such as whether a user has been uniquely identified, the extent to which information about the user can be automatically collected (e.g., using cookies, client-side libraries), URL data, the extent to which the user has a transaction history, and other factors. Models can be constructed for varying levels of specificity, including at the individual user/identity level, cohort level in which users sharing similar characteristics are grouped, merchant level, and merchant cohort level in which users sharing similar characteristics are grouped. Each of these models can be created using multiple features, including features drawn from URL and subsets of URL components, as discussed herein.

In some embodiments, a Random Forest technique, such as XGBoost may be used in determining whether a transaction is likely to be fraudulent. Random forests can be an ensemble learning method for classification, regression and other tasks, that operate by constructing a multitude of decision trees at training time and outputting the class that is the mode of the classes (e.g. classification) or mean prediction (e.g. regression) of the individual trees. As an ensemble method, Random Forest can combine one or more 'weak' machine-learning methods together. Random Forest can be used in supervised learning (e.g. classification and regression), as well as unsupervised learning (e.g. clustering). The random forest approach may be used in binary classification mode in which the probability of that given transaction is fraudulent based on a feature set is mapped to between 0 and 1. Using Random Forest, three phases of model construction and evaluation can be employed: testing, training, and prediction. By way of example, a testing phase may be employed in which historical data about feature sets, such as all transactions completed in 2019, is used to make a model. Once validated, the models may be used in prediction, to predict on new or live features during transactions the probability or likelihood of a fraudulent transaction using, at least in part, feature sets based on one or more URL components.

In embodiment, ensemble methods may also be provided in embodiments, such as combining ML analysis performed by ML engines 214A and 214B. In statistics and machine learning, ensemble methods can use multiple ML model analysis techniques to obtain better predictive performance than could be obtained from any of the constituent learning algorithms. In an example, two models are generated and combined to create one prediction, with one model using the XGBoost technique and one model using a deep neural network (DNN) technique. However, other and additional models may be used including, but not limited to, regular random forest, one balanced random forest, support vector machine, etc. Each is trained to predict the probability or likelihood of a given transaction being fraudulent using user features, such as traditional user features and those from identities, as discussed herein. Different models can then be ensembled together to deliver a single result that can have more power to detect fraudulent transactions, and provide a better prediction accuracy than any one model individually. In some embodiments, the predictions of the models may be weighted, combined using conditional probabilities on permutations, using a purely Bayesian methodology, and/or using cross-validation, etc.

After training of the models used by ML engines 214A through 214B, transaction processing system 216 and/or identifier fraud detection system 220 may employ fraud detection system 214 during transactions to use the ML engines 214A through 214B to predict whether an incoming transaction is likely fraudulent, as discussed above. In embodiments, transaction manager 216 and/or identifier fraud detection system 220 may pass certain transaction attributes (e.g., card number, name on card, email used in a transaction, device attribute(s), etc.) to fraud detection system 214, and may further pass URL features or sets of feature to frau detection system 214. Then, these pieces of information may be used by ML engine(s) 214A through 214B to predict fraud during the processing of a given transaction. ML engine(s) 214A through 214B either individually or collectively make a fraud determination for the transaction, which is provided to manager 222, which is then in turn provided to transaction processing system 216.

Then, based on fraud detection system 214 verifying that transaction parameter(s) including the cryptographically transformed URL component features are not indicative of transaction fraud based on analysis of counts associated with features/feature sets, the transaction processing system 216 completes the processing of the transaction through the merchant CP TX web page 252 including further message exchanges to complete the transaction. Conversely, if fraud is detected transaction processing system 216 exchanges one or more communications with merchant CP TX web page 252 for declining the transaction at merchant CP TX web page 252.

Figure 3:
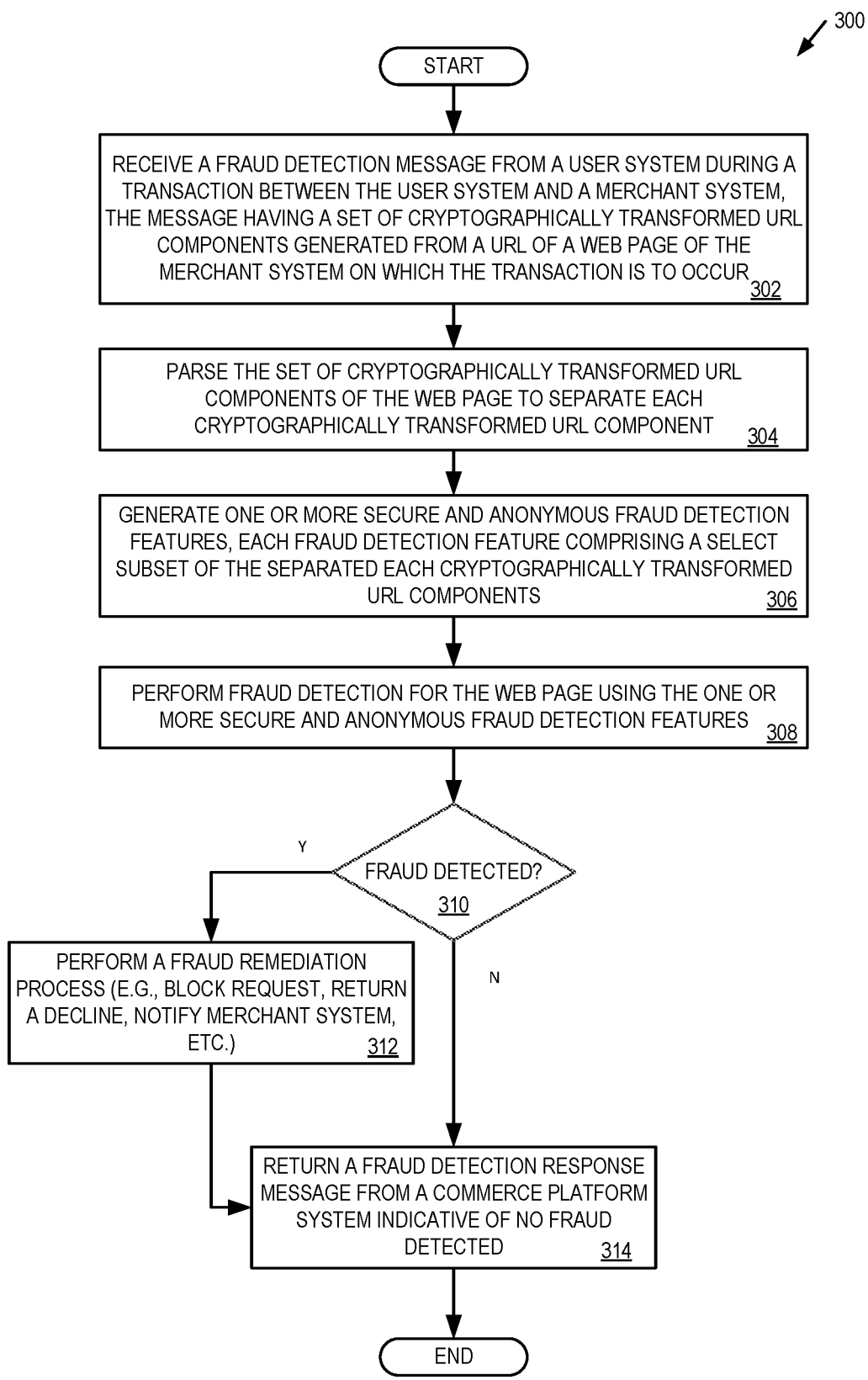
FIG. 3 is a flow diagram of one embodiment of a method for performing privacy preserving fraud detection in network based transactions.

FIG. 3 is a flow diagram of one embodiment of a method 300 for performing privacy preserving fraud detection in network based transactions. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3, processing logic begins by receiving a fraud detection message from a user system during a transaction between the user system and a merchant system, the message having a set of cryptographically transformed URL components generated from a URL of a web page of the merchant system on which the transaction is to occur (processing block 302). As discussed herein, to protect user privacy during transactions, while still ensuring fraud detection ability using web page address features, original URL web page components are cryptographically transformed prior to receipt by processing logic. Such cryptographic transformation may include a one-way hash performed on the data to obfuscate the actual underlying data, while ensuring uniqueness of the received transformed data. Furthermore, the set of cryptographically transformed URL components may be in the format of an original web page from which the transformed components were generated (e.g., URLs 610 or 620 of FIGS. 6B and 6C), to preserve the relevancy of each transformed component to the original web page address.

Processing logic parses the set of cryptographically transformed URL components of the web page to separate each cryptographically transformed URL component (processing lock 304). In embodiments, processing logic may parse a received URL with the transformed components based on special web page address characters to extract each component with data indicative of the components function within the address (e.g., the component functions as a protocol, top level domain, query parameter, domain, etc.).

Processing logic generates one or more secure and anonymous fraud detection features, each fraud detection feature comprising a select subset of the separated each cryptographically transformed URL components (processing block 306). The selected subset may include individual components (e.g., a transformed version of a web address's domain) or a plurality of components (e.g., a transformed version of a web address's sub domain, domain, and top level domain)

Processing logic then performs fraud detection for the web page using the one or more secure and anonymous fraud detection features (processing block 308). In embodiments, a lookup may be performed for each feature to determine a corresponding fraud count (e.g., a number of previously detected fraud instances associated with the feature). The counts associated with the feature are then provided as input to a trained machine learning model, as discussed above. The output of the machine learning model, based on the input features and value, is a probability, score, etc. that fraud is associated with the set of features (i.e., the web page address components or sets of components). In other words, the cryptographically transformed components (and sets of components), and fraud counts associated therewith, enable processing logic to determine whether there is a likelihood of fraud associated with the web page address on which the transaction is occurring.

When fraud is detected by processing logic, processing logic performs a fraud remediation process (processing block 312). Such remedies can include processing logic performing one or more of blocking a transaction, generating a transaction declined message returned to a user of the user system and rendered within the web page, notifying a merchant system of the declined and likely fraudulent transaction, adding a fraud detection to a fraud count associated with the keys used to detect the current fraud for retraining a fraud detection machine learning model, etc.

However, when fraud is not detected processing logic returns a fraud detection response message from a commerce platform system indicative of no fraud detected (processing block 314). Such as message can signal that a transaction can proceed. Furthermore, such message may enable processing logic to finish processing a transaction, including clearing the transaction, generating tokens sent to a merchant system, etc.

Figure 4:
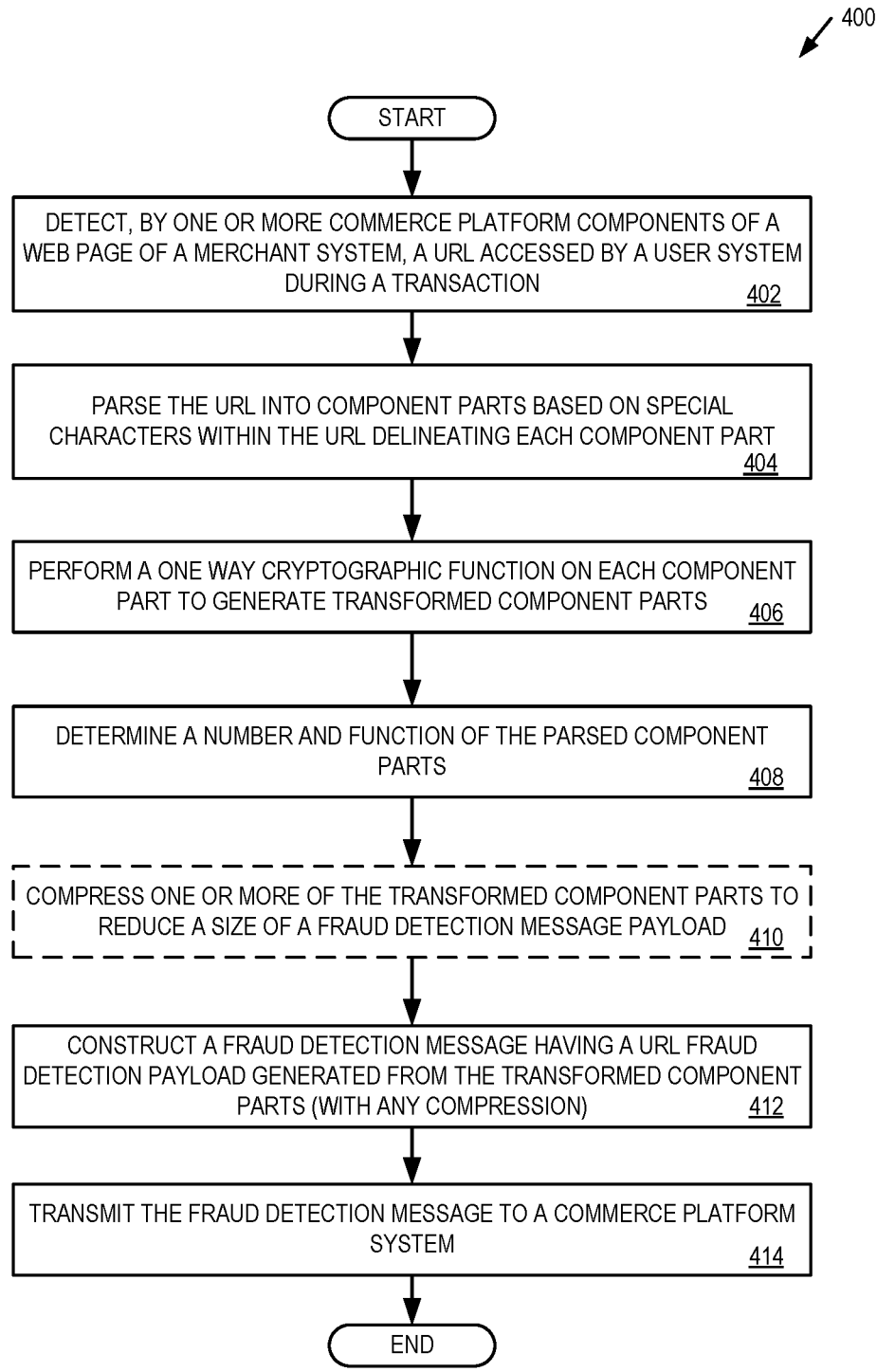
FIG. 4 is a flow diagram of one embodiment of a method for generating a fraud detection payload with cryptographically transformed identifiers used for fraud detection in network based transactions.

FIG. 4 is a flow diagram of one embodiment of a method 400 for generating a fraud detection payload with cryptographically transformed identifiers used for fraud detection in network based transactions. The method 400 is performed by processing logic that may comprise hardware (circuitry, dedicated logic, etc.), software (such as is run on a general purpose computer system or a dedicated machine), firmware, or a combination. In one embodiment, the method 400 is performed by commerce platform system components of a merchant CP TX web page (e.g., commerce platform system components of merchant CP TX web page 132 or 252).

Referring to FIG. 4, processing logic begins by detecting, by one or more commerce platform components of a web page of a merchant system, a URL accessed by a user system during a transaction (processing block 402). In embodiments, the URL is a web page address associated with a merchant system's web page on which a transaction is occurring (e.g., URL 600 of FIG. 6A). In response to detecting the URL, processing logic parses the URL into component parts based on special characters within the URL delineating each component part (processing block 404).

Processing logic then performs a one-way cryptographic function on each component part to generate transformed component parts (processing block 406). As discussed above, the one-way cryptographic function is a privacy preserving function that cannot be reversed, obfuscates the original value of the component, but is sufficiently unique to enable its use in the fraud detection processes discussed above. In embodiments, the one-way cryptographic function is a hashing function utilizing the SHA256, MD5, or other hashing algorithm. Furthermore, in embodiments, the hashing function may be salted (e.g., a salt selected and added to a component prior to hashing) to further obfuscate the underlying data.

Processing logic determines a number and function of the parsed component parts (processing block 408). In embodiments, the special characters that delineate the component parts of the web page address, as well as the components' positions within the original web page address, define their purpose within the web page address. For example, a component preceded by "//" and having "." following the component is indicative of a sub domain component, a component following a "?" is indicative of a query component, and so on. Furthermore, the total number of components within the web page address is counted by processing logic.

Then, processing logic optionally compresses one or more of the transformed component parts to reduce a size of a fraud detection message payload (processing block 410). As discussed above, to ensure that fraud detection messages maintain a sufficient number of relevant fraud detection features, while at the same time ensuring fraud detection message size does not unduly consume network bandwidth, a threshold number of components can be detected. When the threshold is exceeded, a maximum number of hashes with priority to certain web page components is used to select which components will have their full hash values preserved, and which components are truncated and/or combined with other component strings prior to hashing.

Processing logic constructs a fraud detection message having a URL fraud detection payload generated from the transformed component parts (with any compression) (processing block 412). In an embodiment, the fraud detection payload includes a reassembled URL with cryptographically transformed and/or truncated component parts substituted into the original format of the URL (e.g., URL 610 or 620 as illustrated in FIGS. 6B and 6C).

Processing logic then transmits the fraud detection message to a commerce platform system (processing block 414). In embodiments, the transmitted fraud detection message is the message received by processing logic of FIG. 3 at block 302, and is used for performing fraud detection during a remote transaction ensuring robust fraud detection and user data privacy.

Figure 5:
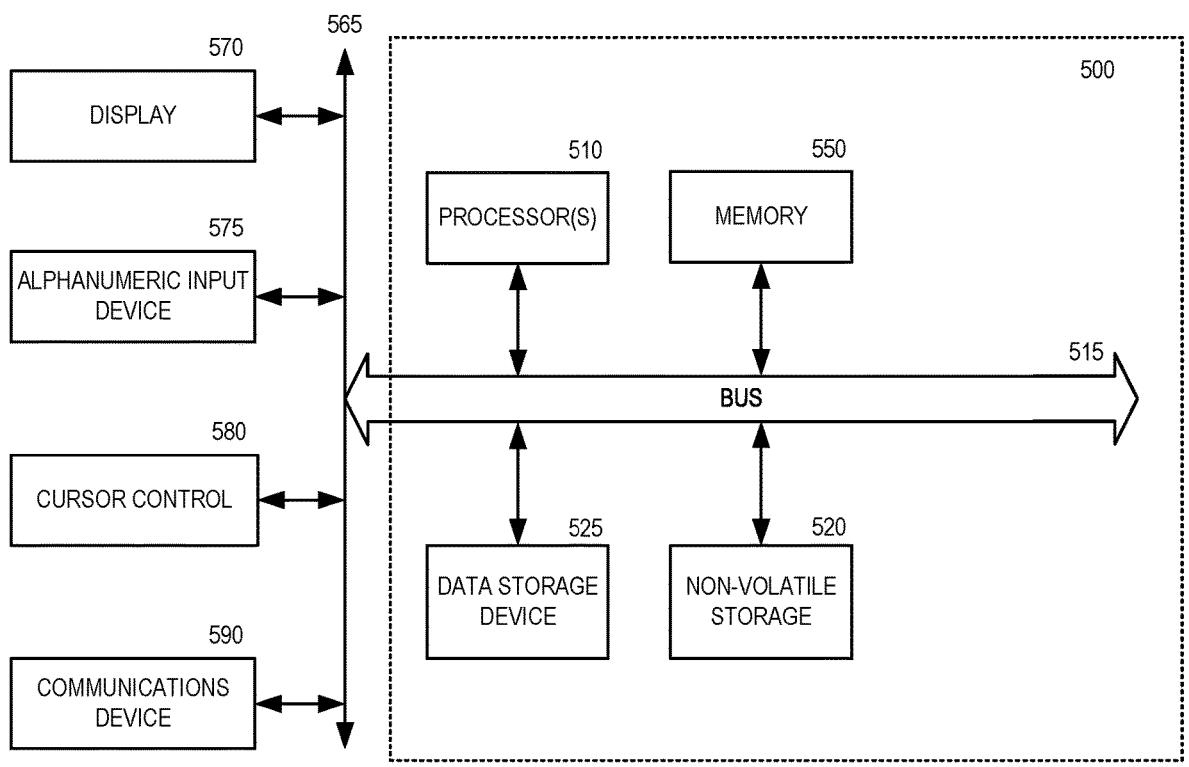
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant development system, user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for performing privacy-preserving fraud detection in network-based network operations, the method comprising:

receiving, by a server system from a user computing system, a fraud detection message during a network operation between the user computing system and a merchant computing system, the fraud detection message having a set of cryptographically transformed universal resource locator (URL) components generated from a URL of a web page of the merchant computing system on which the network operation is to occur;

parsing, by the server system, the set of cryptographically transformed URL components of the web page to separate each cryptographically transformed URL component;

generating, by the server system, one or more secure and anonymous fraud detection features, each fraud detection feature comprising a select subset of the separated cryptographically transformed URL components;

executing, by the server system, a machine learning model that uses the one or more secure and anonymous fraud detection features to determine a likelihood that fraud is occurring in the network operation;

determining, by the server system, that the likelihood of fraud occurring in the network operation satisfies a fraud detection threshold;

incrementing, by the server system, a count of detected fraud for at least one of the one or more secure and anonymous fraud detection features to generate a fraud count associated with the at least one of the one or more secure and anonymous fraud detection features; and training, by the server system, the machine learning model based at least in part on the incremented fraud count associated with the at least one of the one or more secure and anonymous fraud detection features.

2. The method of claim 1, wherein performing fraud detection for the web page using the one or more secure and anonymous fraud detection features comprises:

determining, by the server system, for each of the one or more secure and anonymous fraud detection features, a corresponding fraud count indicative of past detected fraud associated with said each of the one or more secure and anonymous fraud detection features;

processing, by the server system, the one or more secure and anonymous fraud detection features and corresponding fraud counts by the machine learning model trained to detect fraud based on cryptographically transformed URL components and associated fraud counts; and generating, by the machine learning model, a prediction for the likelihood that fraud is occurring in the network operation.

3. The method of claim 2, further comprising:

when the prediction for the likelihood that fraud is occurring in the network operation satisfies the fraud detection threshold, incrementing, by the server system, the count of detected fraud for each of the one or more secure and anonymous fraud detection features to generate an updated fraud count associated with each of the one or more secure and anonymous fraud detection features; and performing retraining, by the server system, of the machine learning model based on one or more updated fraud counts comprising the updated fraud count.

4. The method of claim 1, further comprising:

in response to a determination that the likelihood that fraud is occurring in the network operation satisfies a fraud detection threshold, performing, by the server system, one or more fraud remediation processes comprising declining the network operation between the user computing system and a merchant system, transmitting a transaction declined message for rendering in the web page at the merchant system, and generating a notification to the merchant system of the detected fraudulent network operation.

5. The method of claim 4, in response to a determination that the likelihood that fraud is occurring in the network operation does not satisfy the fraud detection threshold, completing, by the server system, the network operation between the user computing system and the merchant system.

6. The method of claim 1, wherein the set of cryptographically transformed universal resource locator (URL) components are formatted into a fraud detection URL, and each cryptographically transformed URL component in the fraud detection URL corresponds to an original URL component from the web page.

7. The method of claim 6, wherein each cryptographically transformed URL component is a hash value generated using the corresponding original URL component from the web page.

8. The method of claim 6, wherein parsing the set of cryptographically transformed URL components of the web page to separate each cryptographically transformed URL component, comprises:
detecting, by the server system, one or more special characters within the fraud detection URL that delineate individual cryptographically transformed universal resource locator (URL) components within the fraud detection URL; and
extracting, by the server system, each of the individual cryptographically transformed universal resource locator (URL) components, as delineated by the detected one or more special characters, from the fraud detection URL.

9. The method of claim 8, wherein each fraud detection feature, comprising the select subset of the separated each cryptographically transformed URL components, comprises at least one cryptographically transformed URL component, and said each fraud detection feature further comprises data indicative of a function of the at least one cryptographically transformed URL component determined based on detected one or more special characters used to extract the at least one cryptographically transformed URL component from the fraud detection URL.

10. The method of claim 1, wherein the fraud detection message comprises a fraud detection payload that comprises the set of cryptographically transformed universal resource locator (URL) components.

11. The method of claim 1, wherein the cryptographically transformed URL components are generated by server system web page components executing within the web page, the server system web page components comprising one or more functions, API(s), SDK(s), or a combination thereof, distributed by a commerce platform and integrated into the web page by a merchant system prior to the web page being served to the user computing system during the network operation.

12. The method of claim 11, further comprising:
accessing, by the server system web page components executing within the web page, the URL of the web page;
parsing, by the server system web page components, the URL of the web page into component parts of the web page based on special characters that delineate each component part within the URL of the web page;
cryptographically transforming, by the server system web page components, each component part of the web page;
assembling, by the server system web page components, the cryptographically transformed component parts of the web page into a fraud detection URL having a format of the URL of the web page, the cryptographically transformed component parts within the fraud detection URL comprising the set of cryptographically transformed universal resource locator (URL) components;
adding, by the server system web page components, the fraud detection URL to a payload of the fraud detection message; and
transmitting, from the server system web page components to a web server, the fraud detection message.

13. The method of claim 12, wherein the assembling further comprises:
compressing, by the server system, the assembled set of cryptographically transformed universal resource locator (URL) components by truncating at least one of the cryptographically transformed universal resource locator (URL) components, combining two or more component parts of the web page and cryptographically transforming the combined two or more component parts to generate a single cryptographically transformed component part of the web page, or a combination thereof; and
assembling, by the server system, the fraud detection URL after the compressing.

14. The method of claim 13, wherein the truncating is performed for one or more cryptographically transformed universal resource locator (URL) components that exceed one of a plurality of thresholds, each threshold being associated with a type of the one or more cryptographically transformed universal resource locator (URL) components.

15. The method of claim 13, further comprising:
combining, by the server system, the two or more component parts of the web page when a total number of component parts of the URL of the web page exceed a maximum number of components parts, and wherein the two or more component parts of the web page being combined comprise two or more component parts located at an end of the URL of the web page that exceed the maximum number of components parts.

16. The method of claim 1, wherein the server system is a commerce platform system performing one or more payment processing services for a merchant system during the network operation.

17. A non-transitory computer-readable storage medium including instructions that, when executed by a processor, cause the processor to perform operations for performing privacy preserving fraud detection in network-based network operations, the operations comprising:
receiving, by a server system from a user system, a fraud detection message during a network operation between the user system and a merchant system, the fraud detection message having a set of cryptographically transformed universal resource locator (URL) components generated from a URL of a web page of the merchant system on which the network operation is to occur;
parsing, by the server system, the set of cryptographically transformed URL components of the web page to separate each cryptographically transformed URL component;
generating, by the server system, one or more secure and anonymous fraud detection features, each fraud detection feature comprising a select subset of the separated each cryptographically transformed URL components;
executing, by the server system, a machine learning model that uses the one or more secure and anonymous fraud detection features to determine a likelihood that fraud is occurring in the network operation;

determine that the likelihood of fraud occurring in the network operation satisfies a fraud detection threshold;

increment a count of detected fraud for at least one of the one or more secure and anonymous fraud detection features to generate a fraud count associated with the at least one of the one or more secure and anonymous fraud detection features; and train the machine learning model based at least in part on the incremented fraud count associated with the at least one of the one or more secure and anonymous fraud detection features.

18. The non-transitory computer-readable storage medium of claim 17, wherein performing fraud detection for the web page using the one or more secure and anonymous fraud detection features comprises:

determining, for each of the one or more secure and anonymous fraud detection features, a corresponding fraud count indicative of past detected fraud associated with said each of the one or more secure and anonymous fraud detection features;

processing the one or more secure and anonymous fraud detection features and corresponding fraud counts by a machine learning model trained to detect fraud based on cryptographically transformed URL components and associated fraud counts; and generating, by the machine learning model, a prediction for the likelihood that fraud is occurring in the network operation.

19. The non-transitory computer-readable storage medium of claim 17, wherein the set of cryptographically transformed universal resource locator (URL) components are formatted into a fraud detection URL, and each cryptographically transformed URL component in the fraud detection URL corresponds to an original URL component from the web page.

20. The non-transitory computer-readable storage medium of claim 19, wherein each cryptographically transformed URL component is a hash value generated using the corresponding original URL component from the web page.

21. The non-transitory computer-readable storage medium of claim 17, wherein the cryptographically transformed URL components are generated by server system web page components executing within the web page, the server system web page components comprising one or more functions, API(s), SDK(s), or a combination thereof, distributed by a commerce platform and integrated into the web page by the merchant system prior to the web page being served to the user system during the network operation.

22. A server computer system for performing privacy-preserving fraud detection in network-based network operation, comprising:

a memory; and a processor coupled with the memory configured to:

receive, from a user system, a fraud detection message during a network operation between the user system and a merchant system, the fraud detection message having a set of cryptographically transformed universal resource locator (URL) components generated from a URL of a web page of the merchant system on which the network operation is to occur, parse the set of cryptographically transformed URL components of the web page to separate each cryptographically transformed URL component, generate one or more secure and anonymous fraud detection features, each fraud detection feature comprising a select subset of the separated each cryptographically transformed URL components, execute a machine learning model that uses the one or more secure and anonymous fraud detection features to determine a likelihood that fraud is occurring in the network operation;

determine that the likelihood of fraud occurring in the network operation satisfies a fraud detection threshold;

increment a count of detected fraud for at least one of the one or more secure and anonymous fraud detection features to generate a fraud count associated with the at least one of the one or more secure and anonymous fraud detection features; and train the machine learning model based at least in part on the incremented fraud count associated with the at least one of the one or more secure and anonymous fraud detection features.

* * * * *